(12) United States Patent
Schroth et al.

(10) Patent No.: US 10,315,500 B2
(45) Date of Patent: Jun. 11, 2019

(54) ELECTRICAL ENERGY STORAGE FOR A MOTOR VEHICLE

(71) Applicant: Mahle International GmbH, Stuttgart (DE)

(72) Inventors: Holger Schroth, Maulbronn (DE); Andre Loges, Leonberg (DE)

(73) Assignee: Mahle International Gmbh (DE)

(*) Notice: Subject to any disclaimer, the term of this patent is extended or adjusted under 35 U.S.C. 154(b) by 0 days.

(21) Appl. No.: 15/815,298

(22) Filed: Nov. 16, 2017

(65) Prior Publication Data

US 2018/0134135 A1    May 17, 2018

(30) Foreign Application Priority Data

Nov. 17, 2016 (DE) .................. 10 2016 222 676

(51) Int. Cl.
| | |
|---|---|
| *B60K 1/04* | (2019.01) |
| *B60L 11/18* | (2006.01) |
| *B60R 16/02* | (2006.01) |
| *H01M 2/10* | (2006.01) |

(Continued)

(52) U.S. Cl.
CPC .............. *B60K 1/04* (2013.01); *B60L 3/0007* (2013.01); *B60L 11/1877* (2013.01); *B60L 11/1879* (2013.01); *B60R 16/02* (2013.01); *H01M 2/1077* (2013.01); *H01M 2/1083* (2013.01); *H01M 10/44* (2013.01);

(Continued)

(58) Field of Classification Search
CPC .. B60L 11/00; B60L 11/1879; B60L 11/1877; B60K 1/00; B60K 1/04; B60K 2001/0405; B60K 2001/0416; B60K 2001/0438; B60K 2001/005; H01M 2/1077; H01M 2/1235
See application file for complete search history.

(56) References Cited

U.S. PATENT DOCUMENTS

| | | | |
|---|---|---|---|
| 5,154,985 A | 10/1992 | Tanaka | |
| 8,459,390 B2 * | 6/2013 | Brings | ................ B60W 10/04 180/68.5 |

(Continued)

FOREIGN PATENT DOCUMENTS

| | | |
|---|---|---|
| DE | 4100571 A1 | 12/1991 |
| DE | 102008010822 A1 | 8/2009 |

(Continued)

OTHER PUBLICATIONS

Machine translation of English abstract of DE-102013013948.
(Continued)

*Primary Examiner* — James A Shriver, II
*Assistant Examiner* — James J Triggs
(74) *Attorney, Agent, or Firm* — Fishman Stewart PLLC (57) ABSTRACT

An electrical energy storage for a motor vehicle may include a plurality of main cell modules, each having a plurality of accumulator cells. The plurality of accumulator cells may be electrically contacted with one another to form a main power supply network. The plurality of main cell modules may be arranged in a main housing. An emergency cell module may include a plurality of accumulator cells. The plurality of accumulator cells of the emergency cell module may be electrically contacted and arranged in a separate emergency housing.

20 Claims, 2 Drawing Sheets

(51) Int. Cl.
*B60L 3/00* (2019.01)
*H01M 10/44* (2006.01)

(52) U.S. Cl.
CPC .... *B60L 2240/545* (2013.01); *H01M 2220/20* (2013.01); *Y02T 10/705* (2013.01); *Y02T 10/7005* (2013.01)

(56) References Cited

U.S. PATENT DOCUMENTS

| | | | | |
|---|---|---|---|---|
| 2011/0309674 | A1* | 12/2011 | Kamachi | B60L 1/006 307/10.1 |
| 2015/0102666 | A1* | 4/2015 | Izumi | B60L 3/12 307/10.1 |
| 2016/0046201 | A1* | 2/2016 | Min | B60L 3/0046 701/22 |
| 2016/0347160 | A1* | 12/2016 | Landgraf | B60K 1/04 |
| 2017/0361714 | A1* | 12/2017 | Schussler | B60L 3/12 |
| 2018/0201154 | A1* | 7/2018 | Omura | B60L 11/1877 |

FOREIGN PATENT DOCUMENTS

| | | |
|---|---|---|
| DE | 112009002264 T5 | 1/2012 |
| DE | 102009006991 B4 | 8/2013 |
| DE | 102012012897 A1 | 1/2014 |
| DE | 102012015525 A1 | 2/2014 |
| DE | 102013013948 B3 | 10/2014 |
| DE | 102014204662 A1 | 9/2015 |

OTHER PUBLICATIONS

Machine translation of English abstract of DE-102014204662.
English abstract for DE-112009002264.
German search report dated Jul. 11, 2017.
English abstract for DE-102009006991.
English abstract for DE-102012012897.
English abstract for DE-102012015525.
English abstract for DE-102008010822.

* cited by examiner

ELECTRICAL ENERGY STORAGE FOR A MOTOR VEHICLE

CROSS-REFERENCE TO RELATED APPLICATIONS

This application claims priority to German Patent Application No. DE 10 2016 222 676.2 filed on Nov. 17, 2016, the contents of which are hereby incorporated by reference in their entirety.

TECHNICAL FIELD

The invention at hand relates to an electrical energy storage for a motor vehicle, comprising a plurality of accumulator cells, which are combined to cell modules. The invention furthermore relates to a motor vehicle comprising such an electrical energy storage.

The use of electrical energy storages in motor vehicles is well known. Generic energy storages have accumulator cells, wherein a plurality of accumulator cells are in each case combined in a cell module and are electrically contacted or interconnected, respectively. A plurality of such cell modules forms the energy storage.

BACKGROUND

Such an energy storage comprising a plurality of cell modules is known from DE 10 2009 006 991 B4. The respective cell module is accommodated in a module housing. The cell modules accommodated in the module housings are further arranged in a complete housing, which has a reduced stability in predetermined sections. In response to an application of a force on the complete housing, for example in the event of an accident or a crash, a predetermined deformation of the complete housing occurs hereby, which reduces damages to the cell modules.

DE 10 2012 012 897 A1 has a similar goal, whereby individual cell modules are stacked at an incline to one another in a stack direction for this purpose, so that they can move relative to one another.

To avoid damages to the cell modules, DE 10 2008 010 822 A1 proposes a complete housing for the cell modules, which consists of a plurality of housing segments, which can be moved relative to one another in response to an application of a force. This is attained for example with the help of predetermined breaking points between the individual housing segments.

DE 10 2012 015 525 A1 proposes the use of a plurality of energy storages in a motor vehicle, wherein the respective energy storage has a sufficiently high capacity so as to sufficiently supply selected consumers of a motor vehicle.

The invention at hand deals with the object of specifying improved or at least other embodiments, which are characterized in particular by an increased operational safety, for an electrical energy storage of the above-mentioned type as well as for a motor vehicle comprising such an energy storage.

According to the invention, this object is solved by the subject matters of the independent claims. Advantageous embodiments are the subject matter of the dependent claims.

SUMMARY

The invention at hand is based on the general idea of arranging a portion of accumulator cells of an electrical energy storage in a separate housing, which is provided specifically for this purpose. The arranging of the accumulator cells in a separate housing has the result that the accumulator cells arranged in the separate housing continue to be operational and can be used to operate at least a selection of electric consumers of a corresponding application, for example of a motor vehicle, in case the other accumulator cells are damaged, in particular as a result of an application of a force, for example in the event of an accident. The operational safety of the energy storage is thus increased. In an emergency, for example in the event of an accident, it can thus in particular also be ensured that performance-critical consumers can still be supplied.

In accordance with the idea of the invention, the electrical energy storage has a plurality of main cell modules, wherein the respective main cell module has a plurality of accumulator cells, which are electrically contacted or interconnected with one another, respectively. To form a main power supply network of the energy storage, the main cell modules are furthermore electrically contacted or interconnected with one another, respectively. The main cell modules are arranged in a main housing of the energy storage. The energy storage furthermore has an emergency cell module, which has a plurality of accumulator cells, which are electrically contacted or interconnected with one another, respectively. The accumulator cells of the emergency cell module are thereby arranged in a separate emergency housing.

The emergency cell module can hereby be used as a master module of the energy storage, which can be used in particular in emergencies, for example in the event of an accident and/or in case of failure of the main cell modules and/or if a charge state of the main cell modules is fallen below.

It is thereby preferred when the emergency cell module is embodied to be as self-sufficient as possible and independent from the main cell modules.

The electrical contacting or interconnecting of the accumulator cells, respectively, in the respective cell module can be designed arbitrarily, that is, in series and/or in parallel. The same applies for the electrical contacting of the main cell modules, which can be in series and/or in parallel. The accumulator cells of the emergency cell module can also be interconnected in series as well as in parallel.

A mechanical decoupling of the emergency cell module or the accumulator cells thereof, respectively, from the main cell modules, preferably takes place by arranging the accumulator cells of the emergency cell module in a separate emergency housing. This means that mechanical damages to the main cell modules do not inevitably lead to mechanical damages to the emergency cell module or the accumulator cells thereof, respectively. The operational safety of the electrical energy storage is further improved hereby.

It is also preferred when the emergency cell module is thermally decoupled, in particular separated, from the main cell modules. A correspondingly high thermal resistance of the emergency housing can contribute to this. The emergency housing can in particular have a thermal resistance of at least 1000 K/W and can for example be made of fiber-reinforced plastic.

Advantageously, the emergency housing has high-strength mechanical support elements, which are made for example of a high-strength metal alloy and/or fiber-reinforced plastic elements or consist of them. In the alternative or in addition, the emergency housing can have a closed cover of a non-combustible thermal insulating material, such as, for example, mica and/or mineral insulating boards or mats, respectively.

It is also conceivable for the interior of the emergency housing to be filled at least partially, preferably completely, with a material, which conducts heat poorly, such as, for example, synthetic resin. The emergency housing can be sealed through this. The protection of the emergency cell module or the accumulator cells thereof, respectively, can thus also be improved.

In the case of preferred embodiments, the emergency housing has a higher mechanical stability than the main housing. The accumulator cells arranged in the emergency housing are better protected hereby than the accumulator cells of the main cell modules. The emergency cell module can thus also remain undamaged, when a force acts on the main cell module and on the emergency housing, and can thus ensure an electrical supply of consumers.

In the case of preferred embodiments, the emergency housing is embodied as a monocoque housing. This means that the emergency housing is made integrally, in particular of a massive material. The mechanical stability and strength of the emergency housing is improved hereby.

Embodiments, in the case of which the emergency housing is arranged in the interior of the main housing, prove to be advantageous. The main housing hereby forms a protection for the emergency housing and thus an additional protection for the emergency cell module or the accumulator cells thereof, respectively. The likelihood of damages to or of a failure of the emergency cell module, respectively, is thus further reduced.

Embodiments, in the case of which the emergency housing is surrounded by main cell modules, prove to be particularly advantageous. The main cell modules, which are turned off, in particular immediately, in an emergency, thus form a mechanical protection for the emergency housing and thus for the emergency cell module or the accumulator cells thereof, respectively. The main cell modules can thereby in particular serve as a crush zone of the emergency cell module for dissipating kinetic energy.

Embodiments, in which main cell modules surround the emergency housing so as to be closed in a circumferential direction, are further preferred. This means that at least one such main cell module is in each case arranged adjacent to the emergency housing in a longitudinal direction as well as in a transverse direction, which runs at right angles to the longitudinal direction. At least one such main cell module is thus arranged on both sides of the emergency housing in the longitudinal direction and in the transverse direction between the emergency housing and the main housing, in particular a wall of the main housing.

Embodiments, in the case of which the main cell modules are accommodated in a grid structure in the main housing, are advantageous. The respective main cell module is preferably arranged in a grid cell of the grid structure. It is particularly preferred when the grid structure can be deformed as a result of an application of a force. The risk of damages to the main cell modules in response to an application of a force is reduced hereby, because a corresponding deformation of the grid structure occurs initially. For this purpose, the grid structure is preferably embodied so as to be softer and/or more deformable than the main cell modules.

In the case of advantageous alternatives, the emergency housing is movably arranged in the main housing, in particular supported in the main housing. As a result, a mechanical impact on the emergency housing results in a corresponding movement of the emergency housing, which requires the consumption of kinetic energy. Damages to the emergency housing as a result of the mechanical impact is thus avoided or at least further reduced.

Alternatives, in the case of which provision is made in the main housing for a plurality of rods, which connect two opposite walls of the main housing, in particular firmly, to one another are considered to be advantageous. The rods thereby form a cage, in which the emergency housing is accommodated, in particular movably supported. In the area of the cage, the rods effect a significant reinforcement of the main housing. In addition to an additional protection for the emergency cell module, the cage thus also provides a protection for the main cell modules and thus leads to an increased operational safety.

Advantageously, the accumulator cells of the emergency cell module are electrically contacted or interconnected, respectively, to form an emergency power supply network.

Embodiments, in the case of which the emergency power supply network formed by the accumulator cells of the emergency cell module is separated from the main power supply network of the main cell modules, in particular electrically separated, are thereby preferred. It is in particular avoided hereby that an interference of the main power supply network, in particular caused by damages to main cell modules, impacts the emergency power supply network, in particular interferes with or damages it, respectively, or at least reduces a corresponding risk. As a consequence, the operational safety of the energy storage is thus increased.

Embodiments, in the case of which the emergency power supply network has an emergency voltage level, which differs from a main voltage level of the main power supply network, are advantageous. This means that the electrical voltage of the emergency power supply network differs from the electrical voltage of the main power supply network. The emergency voltage level can thereby in particular be lower than the main voltage level. It is conceivable thereby that the emergency power supply network is a low voltage power supply network, while the main power supply network is a high voltage power supply network.

On principle, the main power supply network and the emergency cell modules can be connected to electric consumers via a common connecting device.

Embodiments, in the case of which the main power supply network and the emergency cell module can be connected to electric consumers via separate connecting devices, are preferred. This means that the energy storage has a main connecting device for electrically connecting the main power supply network to at least one electric consumer and an emergency connecting device, which is separate from the main connecting device, for connecting the emergency cell module, in particular the emergency power supply network, to at least one electric consumer. A more self-sufficient embodiment of the emergency cell module is attained hereby and the operational safety of the energy storage is further improved.

It is particularly preferred thereby when the emergency connecting device is embodied in such a way that the electrical connection to the at least one consumer is also maintained in response to an application of a force on the energy storage, in particular on the emergency connecting device. The emergency connecting device can be embodied to be soft and/or elastic for this purpose.

To increase the operational safety of the energy storage, further, in particular operationally-critical components, can be arranged in the emergency housing. For example a management system for controlling the energy storage is arranged in the emergency housing for this purpose. At least one electrical converter, for example a voltage converter, can also be arranged in the emergency housing. It is also conceivable to arrange components required in an emergency, for example in the event of an accident and/or in the event of a disaster, in which essential components of the energy storage and/or of the corresponding vehicle fail, in the emergency housing. These include for example communication devices for communication with external, in particular vehicle-external locations, in order to report about the emergency and to signal it, for example.

In the case of preferred embodiments, the emergency cell module is not used during normal operation of the energy storage. This means that the stored electrical energy in the emergency cell module is not used during a usual operation of the energy storage. It is advantages for this purpose, when a monitoring of the emergency cell module is supplied with energy otherwise during such an operation. This means that monitoring measures for monitoring the emergency cell module during a usual or normal operation, respectively, are not electrically supplied by the emergency cell module itself. It is conceivable thereby that an electrical state of the emergency cell module takes place via an electrical contact with the main power supply network of the main cell modules. For this purpose, the emergency cell module for monitoring the electrical state of the emergency cell module can be electrically connected to the main power supply network via an electrical contact. It is preferred thereby when this monitoring takes place in a type of self-monitoring of the emergency cell module. This means that components for monitoring the emergency cell module are arranged in the emergency housing, but are supplied by the main power supply network.

It is preferred when the monitoring is embodied in such a way that an electrical supply occurs via the emergency cell module or via the emergency power supply network, respectively, if the main cell modules are damaged and/or in the event the main cell modules fail.

It is particularly preferred thereby when the electrical contact is embodied to be releasable in such a way that the electrical connection is interrupted, when a predetermined force is applied to the contact. This means that a target interruption point is created, which leads to an interruption of the electrical contact between the emergency cell module and the main power supply network. It is in particular avoided hereby that damages to or interferences in the emergency cell module caused by the contact occur, if the predetermined force is applied or such damages or interferences are at least reduced.

Alternatives, in the case of which the energy storage is embodied in such a way that the emergency cell module is recharged electrically, when the charge state of the emergency cell module drops below a predetermined value or when the capacity of the emergency cell module drops below a predetermined value, respectively, prove to be advantageous. The predetermined value can in particular be a fraction of the maximum charge state or of the maximum capacity of the emergency cell module, respectively. The value can in particular be 80% of the maximum charge state or of the maximum capacity, respectively.

Particularly preferably, the emergency cell module is charged at a low charge rate, so that the composition or components, respectively, of the accumulator cells, in particular the cellular chemistry thereof, are/is not damaged or damaged as little as possible. The service life of the emergency cell module is thus extended. The charge rate is thereby preferably less than 1 C, particularly preferably between 0.1 C and 0.3 C.

The charging of the emergency cell module can be realized via the main cell module. This means that the emergency cell module is electrically supplied by the main cell module in order to charge the emergency cell module. An electrical contact between the main cell module and the emergency cell module is present hereby. The electrical contact can be the same, as is used to monitor the emergency cell module. In the alternative, the contact used to charge the emergency cell module is embodied to be releasable in such a way that the electrical connection is interrupted, when a predetermined force is applied to the contact. This means that a target interruption location is created, which leads to an interruption of the electrical contact between the emergency cell module and the main power supply network. It is in particular avoided hereby that damages to or interruptions in the emergency cell module caused by the contact occur, if the predetermined force is applied, or such damages or interferences are at least reduced.

In the case of preferred embodiments, the energy storage has an electrical temperature control unit for controlling the temperature of the emergency cell module. During the usual operation of the energy storage, the temperature control device can be supplied by a source, which is external from the emergency cell module, for example by the main power supply network.

It is particularly preferred when the temperature control device can be electrically supplied by the emergency cell module, in particular in an emergency, for example in the event of an accident and/or damages to the main cell modules. This means that the emergency cell module controls its own temperature. Provision can be made thereby for a switch-over to be made from the external supply to the internal supply by the emergency cell module, in particular by the emergency power supply network, when such an emergency is detected.

On principle, the accumulator cells of the emergency cell module can be of the same type as the accumulator cells of the respective main cell module. It is also conceivable that the accumulator cells of the emergency cell module are of a different type than the accumulator cells of the respective main cell module, in particular that they are designed for a longer service life and/or have a different capacity and/or are mechanically more stable and the like. Alternatives, in the case of which at least one accumulator cell of one of the main cell modules is of a different type than at least one other accumulator cell of the same or of a different main cell module, are also conceivable.

It goes without saying that the energy storage can also have a plurality of such emergency cell modules. The emergency cell modules can thereby be spatially separated from one another.

It goes without saying that, in addition to the energy storage, a motor vehicle comprising such an energy storage also belongs to the scope of this invention.

The motor vehicle thereby has a power supply, into which electric consumers are integrated. Such electric consumers are, for example, a drive device for driving the motor vehicle, a power steering, a brake assembly, a communication device and the like.

Advantageously, the motor vehicle is embodied in such a way, in particular equipped with such a control device, which is embodied in such a way that it supplies a selection of at least one electric consumer via the emergency cell module after a predetermined event.

In addition to the increased operational safety of the energy storage, an increased operational safety of the motor vehicle is thus attained as well. In the event of a crash or an accident of the motor vehicle, respectively, selected electric consumers can in particular be supplied further so as to increase the safety for passengers of the motor vehicle and/or of the motor vehicle.

It is in particular conceivable to disconnect the main power supply network from the power supply and to supply selected components by the emergency cell module, in particular the emergency power supply network, in the event of an accident of the motor vehicle, in particular when the main cell modules are damaged. The selected consumers include for example a power steering, a brake as well as further safety-relevant consumers, such as an extinguishing system. In such cases, communication devices, which serve for the communication of the motor vehicle with external locations, for example for notifying the external location of the emergency, in particular of the accident, the transfer of a state of the motor vehicle, the establishing of an acoustic contact with an emergency response center, and the like, can be supplied as well.

In the event of a disaster of the motor vehicle, in which components of the motor vehicle, which are critical for operation, in particular the main cell modules, fail, the emergency cell can also be used to electrically supply selected electric consumers. It is in particular conceivable in the event of such a disaster to supply a temperature control device for controlling the temperature of the energy storage in such a way that the electrical supply of the motor vehicle, in particular of a drive of the motor vehicle, can be maintained.

It is also conceivable to operate the emergency cell as reserve, which is used to supplement the main cell modules or the main power supply network, respectively, when there is a corresponding need, for example when a capacity or a charge state, respectively, of the main cell modules drops below a predetermined value. In the case of an electrical supply by the main cell modules, which is insufficient for the drive, the emergency cell module can thus in particular be used to ensure a drive of the corresponding motor vehicle to the next charging station. In addition to the drive, a navigation device of the motor vehicle, for example, can also be supplied with the emergency cell module for this purpose.

The emergency cell module is preferably operated to optimize the service life. The emergency cell module is in particular operated with small electrical currents, e.g. max. 60 A if a drive of the corresponding motor vehicle by the emergency cell module is required, or max. 16 A, when such a drive is not required. Moreover, it is preferred when the emergency cell module, at least during normal operation of the energy storage, has a charge state of between 80 and 90% of the total charge state. The emergency cell module is furthermore maintained within a temperature range, which is optimized with regard to service life, for example between 10° C. and 30° C.

Further important features and advantages of the invention follow from the subclaims, from the drawings and from the corresponding figure description by means of the drawings.

It goes without saying that the above-mentioned features and the features, which will be explained below, cannot only be used in the respective specified combination, but also in other combinations or alone, without leaving the scope of the invention at hand.

Preferred exemplary embodiments of the invention are illustrated in the drawings and will be explained in more detail in the description below, whereby identical reference numerals refer to identical or to similar or to functionally identical components.

BRIEF DESCRIPTION OF THE DRAWINGS

In each case schematically.

DETAILED DESCRIPTION

Figure 1:
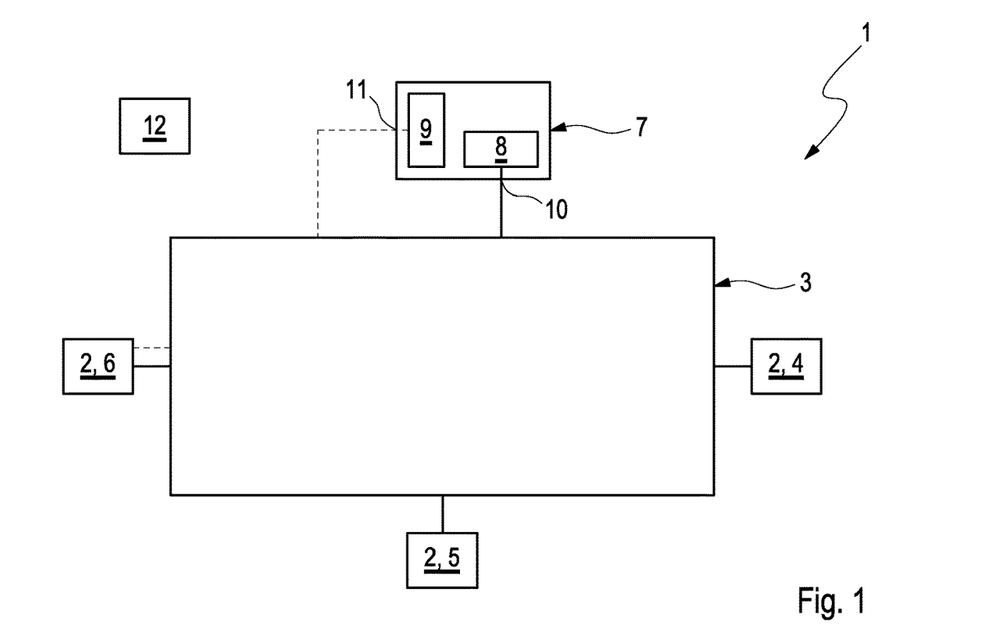
FIG. 1 shows a highly simplified, circuit diagram-like illustration of a motor vehicle comprising an electrical energy storage.

A motor vehicle 1, as it is illustrated in a highly simplified manner in FIG. 1, has a plurality of electric consumers 2, which are integrated into an on-board electrical system 3 of the motor vehicle 1. The electric consumers 2 can be, for example, a drive device 4, a navigation device 5 as well as a communication device 6 for communication with vehicle-external locations. The electric consumers 2 are electrically supplied by an electrical energy storage 7, which is electrically connected to the on-board electrical system 3. The shown electrical energy storage 7 has a main power supply network 8 as well as an emergency power supply network 9, which is separated from the main power supply network 8, in particular electrically separated. The main power supply network 8 is electrically connected to the on-board electrical system 3 via a main connecting device 10 and thus supplies the electric consumers 2. The emergency power supply network 9 can be connected to the on-board electrical system 3 via an emergency connecting device 11, wherein this connection is illustrated accordingly in a dashed manner. If necessary, the emergency power supply network 9 can thereby be electrically connected to the on-board electrical system 3 via the emergency connecting device 11, in order to electrically supply at least one of the consumers 2. The emergency power supply network 9 is used in particular when an interference is present in the main power supply network 8 and/or when the main power supply network 8 is damaged, for example as a result of an application of a force, in particular an accident. The motor vehicle 1 hereby has a control device 12, which controls the motor vehicle 1 accordingly. In the shown example, not all electric consumers 2, but a selection of the electric consumers 2, in the shown example the communication device 6 merely as an example, are electrically supplied via the emergency power supply network 9. For this purpose, the emergency power supply network 9 can be eclectically connected to a part of the on-board electrical system 3, in particular to a non-illustrated subnet of the on-board electrical system 3.

Figure 2:
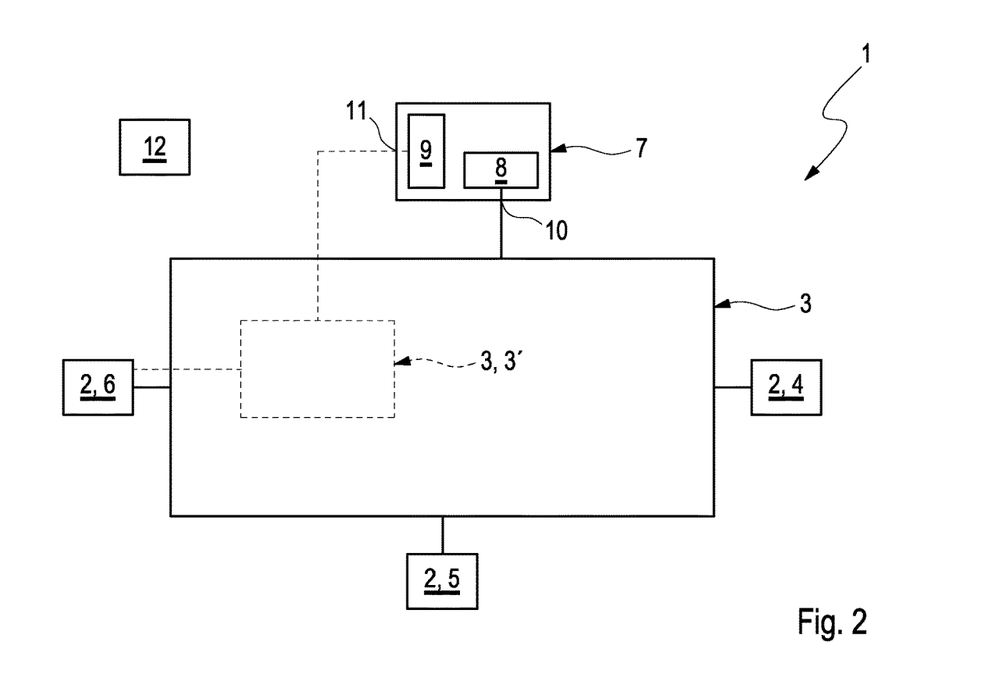
FIG. 2 shows a highly simplified, circuit diagram-like illustration of the motor vehicle in the case of a different exemplary embodiment.

A different exemplary embodiment of the motor vehicle 1 can be seen in FIG. 2. In the case of this exemplary embodiment, the emergency power supply network 9 is not electrically contacted or cannot be contacted, respectively, with the same on-board electrical system 3, to which the main power supply network 8 is electrically connected. In fact, provision is made for a second on-board electrical system 3, 3', into which a selection of the electric consumers 2 are integrated as well and can be supplied via the emergency power supply network 9.

The control device 12 is embodied in such a way that it separates the main power supply network 8 from the on-board electrical system 3, in particular in the case of damages to or an interference of the main power supply network 8, for example in the event of an accident, and establishes an electrical supply of the selected electric consumers 2 via the emergency power supply network 9. This occurs in particular by establishing an electrical connection to the second on-board electrical system 3' in FIG. 2 or with the subnet in FIG. 1, respectively.

Figure 3:
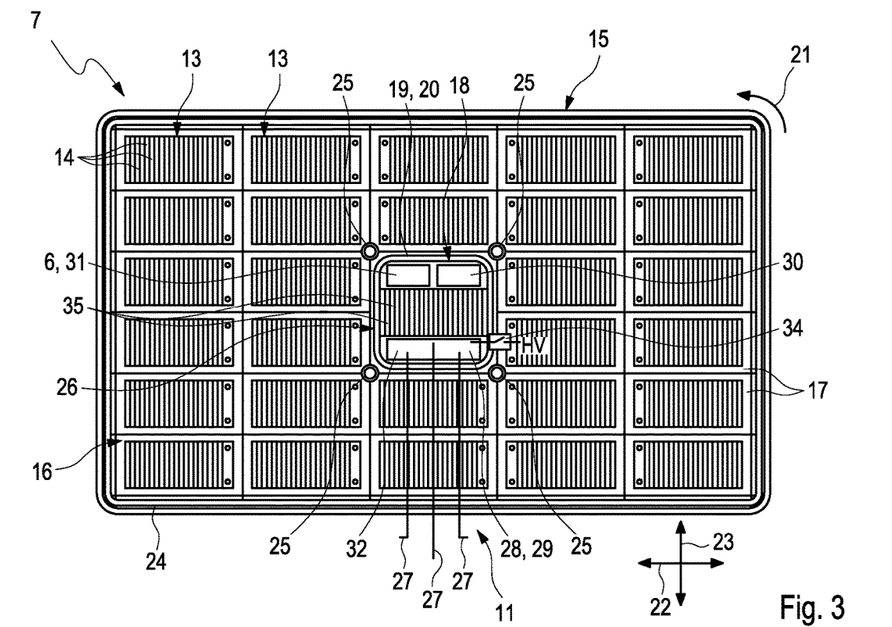
FIG. 3 shows a section through the energy storage.

An example of such an electrical energy storage 7 is illustrated in FIG. 3. The energy storage 7 has a plurality of main cell modules 13, which in each case comprise a plurality of accumulator cells 14. The accumulator cells 14 of the respective main cell module 13 are electrically contacted or interconnected, respectively. For this purpose, the accumulator cells 14 of the respective main cell module 13 can be contacted in series or in parallel. The main cell modules 13 are furthermore electrically contacted or interconnected to one another, respectively, and thus form the main power supply network 8 (see FIGS. 1 and 2) of the energy storage 7. The main cell modules 13 are thereby arranged in a main housing 15 of the energy storage 7. In the shown example, a grid structure 16 comprising regularly arranged grid segments 17 is arranged in the main housing 15, wherein such a main cell module 13 is arranged in the respective grid segment 17.

The energy storage 7 also has an emergency cell module 18, which has a plurality of accumulator cells 35, which are electrically contacted or interconnected to one another, respectively. The accumulator cells 35 of the emergency cell module 18 thereby form the emergency power supply network 9 (see FIGS. 1 and 2). The accumulator cells 35 of the emergency cell module 18 are arranged in an emergency housing 19, which is separated from the main housing 15. The emergency housing 19 thereby preferably has a higher mechanical stability than the main housing 15 and can be embodied as a monocoque housing 20.

In the shown example, the emergency housing 19 and thus the emergency cell module 18 is arranged in the main housing 15 and is surrounded by main cell modules 13. Main cell modules 13 thereby surround the emergency housing 19 in a circumferential direction 21 of the emergency housing 19 in a closed manner such that at least one such main cell module 13 is in each case arranged between the emergency housing 19 and a wall 24 of the main housing 15 in a longitudinal direction 22 as well as in a transverse direction 23, which runs at right angles to the longitudinal direction 22. In the shown example, two such main cell modules 13 are in each case arranged between the emergency housing 19 and the wall 24 of the main housing 15 in the respective longitudinal direction 22 and transverse direction 23. In the shown view, the emergency cell module 18 or the emergency housing 19, respectively, is arranged substantially centrally in the main housing 15 in the longitudinal direction 22 and in the transverse direction 23. The main cell module 13 and the main housing 15 thus form a crush zone for the emergency cell module 18 or the emergency housing 19, respectively, for dissipating kinetic energy. The emergency cell module 18 or the emergency housing 19, respectively, is hereby arranged in a corresponding grid segment 17 of the grid structure 16.

It can furthermore be seen that, in the shown example, provision is made for four rods 25, which run at right angles to the longitudinal direction 22 and at right angles to the transverse direction 23, and which in each case firmly connect corresponding walls of the main housing 15, which, due to the view, are not visible. The rods 25 form corners of the grid segment 17, in which the emergency cell module 18 is arranged. The rods 25 thereby form a cage 26, in which the emergency cell module 18 or the emergency housing 19, respectively, is arranged. The emergency housing 19 can hereby be supported on at least one rod 25 and can thus be movably arranged in the main housing 15.

It can furthermore be seen that the emergency connecting device 11 in the shown example has three different connections 27. A different electrical voltage is thus applied at the respective connection 27 during the operation of the emergency cell module 18, so that different electric consumers 2 can be supplied. The respective connection 27 can be electrically connected to the same on-board electrical system 3 or sub on-board electrical system 3, respectively, or to different vehicle power supplies 3.

It can furthermore be seen that further components of the motor vehicle or of the energy storage 7, respectively, which are necessary of the operation, are arranged in the emergency housing 19. These include, for example, an electrical converter 28, in particular a voltage converter 29, a management system 30 for controlling the energy device 7, a communication device 31, in particular the communication device 6 shown in FIGS. 1 and 2 for communication with vehicle-external locations, or an emergency response center, respectively, and an interface 32 for electrically sending and receiving an electrical current.

Figure 4:
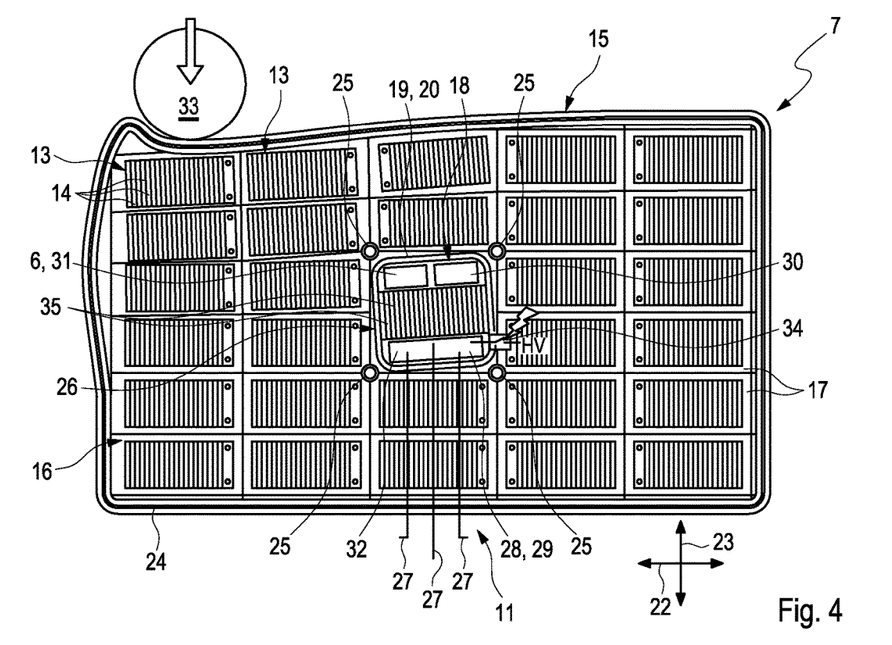
FIG. 4 shows the view from FIG. 3 in response to an application of a force on the energy storage.

FIG. 4 illustrates a state, in which, as symbolized with a round post 33, a force is applied to the energy storage 7, for example as a result of an accident. It can be seen that the application of the force initially leads to a deformation of the main housing 15 as well as to a shift of the main cell modules 13, so that the force, which is applied, is reduced significantly. At least initially, the shift of the main cell modules 13 leads only to a deformation of the grid structure 16, so that the main cell modules 13 remain undamaged. Due to the shift of the main cell modules 13, however, the main power supply network 8 is disrupted. It can be seen that the emergency cell module 18 is not damaged or impacted, respectively, when the force is applied. Due to the application of the force, the emergency cell module 18 is thereby slightly rotated only inside the main housing 15. Due to the fact that the emergency connecting device 11 or the connections 27, respectively, are equipped so as to be elastic or deformable, respectively, the emergency connecting device 11 is not damaged hereby and the corresponding electrical connections are not separated, so that an electrical supply of the selected electric consumers 2 is also ensured in response to such an application of force. The further components arranged in the emergency housing 19, in particular the converter 28, the management system 30, the communication device 31 or the interface 32, respectively, remain undamaged and operational hereby.

In response to such an application of force, the electrical connection between the main power supply network 8 and the on-board electrical system 3 is preferably separated, for example with the help of the control device 12. Only the selected electric consumers 2 are thus electrically supplied via the emergency power supply network 9.

To consume or to provide, respectively, the energy stored in the emergency cell module 18 only when corresponding events occur, it is preferred when a monitoring of the emergency cell module 18 is electrically supplied by the main electric circuit 8 and thus by the main cell modules 13. For this purpose, provision is made between the main power supply network 8 or the main cell modules 13, respectively, and the emergency cell module 18 for a switchable electrical contact 34. As follows from a combination of FIGS. 3 and 4, the electrical contact 34 is embodied in such a way that the electrical connection is interrupted, when the force is applied, in particular when a predetermined force is applied. Damages to the emergency cell module 18 as a result of the application of the force, in particular on the electrical contact 34, are in particular avoided hereby.

A non-illustrated temperature control device for controlling the temperature of the emergency cell module 18 can also be electrically supplied via the electrical contact 34. If the electrical contact 34 is interrupted, the temperature control device is preferably electrically supplied by the emergency cell module 18 itself, in particular by the emergency power supply network 9.

It is also conceivable to recharge the emergency cell module 18 via at least one such main cell module 13, in particular by the main power supply network 8, when the charge state of the emergency cell module 18 drops below a predetermined value, for example below 80% of the maximum charge state of the emergency cell module 18. The emergency cell module 18 can be connected to the main power supply network 8 via the electrical contact 34 or another, non-illustrated electrical contact, for this purpose.

The invention claimed is:

1. An electrical energy storage for a motor vehicle, comprising:
   a plurality of main cell modules, each having a plurality of accumulator cells electrically contacted with one another to form a main power supply network;
   a main housing, wherein the plurality of main cell modules are arranged in the main housing; and
   an emergency cell module having a plurality of accumulator cells electrically contacted with one another;
   an emergency housing separate from the main housing and arranged in an interior of the main housing, wherein the plurality of accumulator cells of the emergency cell module are arranged in the emergency housing; and
   wherein the plurality of main cell modules are arranged to surround the emergency housing completely in a circumferential direction of the emergency housing such that at least one of the plurality of main cell modules is arranged between the emergency housing and the main housing in a longitudinal direction and in a transverse direction extending perpendicularly to the longitudinal direction.

2. The energy storage according to claim 1, wherein the emergency housing has a higher mechanical stability than the main housing.

3. The energy storage according to claim 1, further comprising a deformable grid structure arranged within the main housing and defining a plurality of grid segments, the plurality of grid segments extending along the longitudinal direction and the transverse direction and surround the emergency housing completely in the circumferential direction, wherein each of the plurality of main cell modules are arranged within a respective grid segment of the plurality of grid segments.

4. The energy storage according to claim 1, wherein the emergency housing is movably arranged in the main housing.

5. The energy storage according to claim 1, wherein the main housing includes a plurality of rods connecting two opposite walls of the main housing to one another, and defining a cage for accommodating the emergency housing.

6. The energy storage according to claim 1, wherein the plurality of accumulator cells of the emergency cell module are electrically contacted to form an emergency power supply network, wherein the emergency power supply network is separated from the main power supply network.

7. The energy storage according to claim 6, wherein the emergency power supply network includes an emergency voltage level differing from a main voltage level of the main power supply network.

8. The energy storage according to claim 1, further comprising:
   a main connecting device electrically connecting the main power supply network to at least one consumer, and
   an emergency connecting device separate from the main connecting device, electrically connecting the emergency cell module to at least one consumer.

9. The energy storage according to claim 1, wherein the emergency housing is a monocoque housing.

10. The energy storage according to claim 1, further comprising at least one of:
    a management system configured to control the energy storage arranged in the emergency housing; and
    an electrical converter arranged in the emergency housing.

11. The energy storage according to claim 1, wherein the emergency cell module is electrically connected to the main power supply network via an electrical contact to monitor an electrical state of the emergency cell module.

12. The energy storage according to claim 1, wherein the emergency cell module is rechargable via the main power supply network when a predetermined charge state of the emergency cell module is fallen below.

13. The energy storage according to claim 11, wherein the electrical contact is configured to be releasable so that the electrical connection is interrupted, when a predetermined force is applied to the contact.

14. The energy storage according to claim 1, further comprising an electrical temperature control device controlling the temperature of the emergency cell module, the emergency cell module configured to supply electricity to the temperature control device.

15. A motor vehicle comprising a power supply having at least one electric consumer and an energy storage, the energy storage including:
    a plurality of main cell modules, each having a plurality of accumulator cells electrically contacted with one another to form a main power supply network;
    a main housing enclosing the plurality of main cell modules such that the plurality of main cell modules are arranged in the main housing;
    an emergency cell module having a plurality of accumulator cells electrically contacted with one another, the plurality of accumulator cells of the emergency cell module arranged in a separate emergency housing and being configured to electrically supply the at least one electric consumer; and
    wherein the main housing includes a plurality of rods structured and arranged to connect two opposing walls of the main housing to one another and define a cage for the emergency housing, and wherein the emergency housing is arranged within the cage.

16. The energy storage according to claim 15, wherein the emergency housing is supported on at least one rod of the plurality of rods and is movably arranged within the cage such that the emergency housing is movable when a sufficient external force is applied.

17. The energy storage according to claim 15, further comprising a deformable grid structure arranged within the main housing and defining a plurality of grid segments, the plurality of grid segments extending along a longitudinal direction and a transverse direction extending perpendicularly to the longitudinal direction and surrounding the emergency housing completely in a circumferential direction of the emergency housing, wherein each of the plurality of main cell modules are arranged within a respective grid segment of the plurality of grid segments;
    wherein the plurality of rods extend between the two opposing walls of the main housing in a direction perpendicular to both the longitudinal direction and the transverse direction and form corners of a grid segment of the plurality of grid segments.

18. The energy storage according to claim 1, wherein the plurality of main cell modules are arranged to surround and contact the emergency housing completely in the circumferential direction of the emergency housing.

19. The energy storage according to claim 1, wherein the main housing has a first longitudinal end and a second longitudinal end disposed opposite one another in the longitudinal direction, and a first transverse end and a second transverse end disposed opposite one another in the transverse direction, and wherein at least one main cell module of the plurality of main cell modules is arranged between the emergency housing and the first longitudinal end, the second longitudinal end, the first transverse end, and the second transverse end of the main housing, respectively.

20. The energy storage according to claim 3, wherein:
the main housing includes a plurality of rods connecting two opposite walls of the main housing to one another and defining a cage for the emergency housing, the plurality of rods structured to reinforce the main housing in a region of the cage such that the main housing and the deformable grid structure deform at a lower force than the cage; and
the emergency cell module is arranged within the cage, and the cage is disposed between the emergency housing and the plurality of grid segments that surround the emergency housing in the circumferential direction, the deformable grid structure and the plurality of main cell modules forming a crush zone surrounding the cage in the circumferential direction.

* * * * *